(12) United States Patent
Rabinovitch et al.

(10) Patent No.: US 12,488,177 B2
(45) Date of Patent: Dec. 2, 2025

(54) WAVEFORM CAPTURE USING MULTICYCLE PATH PROPERTIES

(71) Applicant: Synopsys, Inc., Mountain View, CA (US)

(72) Inventors: Alexander Rabinovitch, Shrewsbury, MA (US); Baijayanta Ray, Bangalore (IN)

(73) Assignee: Synopsys, Inc., Sunnyvale, CA (US)

(*) Notice: Subject to any disclaimer, the term of this patent is extended or adjusted under 35 U.S.C. 154(b) by 712 days.

(21) Appl. No.: 17/870,381

(22) Filed: Jul. 21, 2022

(65) Prior Publication Data
US 2024/0028812 A1    Jan. 25, 2024

(51) Int. Cl.
*G06F 30/398*    (2020.01)

(52) U.S. Cl.
CPC .................................. *G06F 30/398* (2020.01)

(58) Field of Classification Search
CPC .... G06F 3/0673; G06F 1/3225; G06F 1/3237; G06F 1/324; G06F 13/36; G06F 30/33; G06F 11/2268; G06F 30/3312; G06F 30/392; G06F 2119/12; G06F 21/78; G06F 3/0625; G06F 30/398; G06F 30/331; G06F 11/3457; H01L 23/5386; H01L 24/11; H01L 2924/15311; H01L 2224/73267; H01L 23/49816
USPC .................................................. 716/108–115
See application file for complete search history.

(56) References Cited

U.S. PATENT DOCUMENTS

| | | | |
|---|---|---|---|
| 9,003,256 B2 * | 4/2015 | Lai | G11C 29/50012 714/738 |
| 2019/0385057 A1 * | 12/2019 | Litichever | H04L 63/14 |
| 2020/0083896 A1 * | 3/2020 | Mostafanezhad | H03M 1/1265 |

* cited by examiner

*Primary Examiner* — Binh C Tat
(74) *Attorney, Agent, or Firm* — Patterson + Sheridan, LLP

(57) ABSTRACT

A method includes determining a plurality of signals that have been selected for waveform capture, forming, based on a respective numbers of clock cycles for the plurality of signals to update, a first group of signals and a second group of signals, sampling the first group of signals according to a first sampling clock signal to produce a first set of sampled signals, and sampling the second group of signals according to a second sampling clock signal to produce a second set of sampled signals. The method also includes generating a waveform capture frame based on the first set of sampled signals and the second set of sampled signals.

14 Claims, 9 Drawing Sheets

WAVEFORM CAPTURE USING MULTICYCLE PATH PROPERTIES

TECHNICAL FIELD

The present disclosure relates to electronic circuit design, and more specifically, to electronic circuit emulation.

BACKGROUND

Electronic circuit designs may be tested and verified prior to fabrication. To improve the speed of testing, emulation systems may be used to emulate or simulate the electronic circuit design.

SUMMARY

System and methods for testing electronic circuit designs are described herein. According to an embodiment, a method for testing an electronic circuit design includes determining a plurality of signals in the electronic circuit design that have been selected for waveform capture. Each of the plurality of signals updates after a respective number of clock cycles. The method also includes forming, based on the respective numbers of clock cycles for the plurality of signals to update, a first group of signals from the plurality of signals and a second group of signals from the plurality of signals and sampling the first group of signals according to a first sampling clock signal to produce a first set of sampled signals. The first sampling clock signal is set according to a minimum of the respective numbers of clock cycles for the signals of the first group of signals to update. The method further includes sampling the second group of signals according to a second sampling clock signal to produce a second set of sampled signals. The second sampling clock signal is set according to a minimum of the respective numbers of clock cycles for the signals of the second group of signals to update. The method also includes generating a waveform capture frame based on the first set of sampled signals and the second set of sampled signals.

A size of the first group of signals may be based on the minimum of the respective numbers of clock cycles for the signals of the first group of signals to update. A size of the second group of signals may be based on the minimum of the respective numbers of clock cycles for the signals of the second group of signals to update. The size of the first group of signals may be larger than the size of the second group of signals based on the minimum of the respective numbers of clock cycles for the signals of the first group of signals to update being larger than the minimum of the respective numbers of clock cycles for the signals of the second group of signals to update. The method may also include sampling the first group of signals according to the first sampling clock signal to produce a third set of sampled signals. The waveform capture frame may be generated further based on the third set of sampled signals.

Generating the waveform capture frame may include aggregating the first set of sampled signals and the second set of sampled signals into the waveform capture frame based on detecting a change in the first set of sampled signals and the second set of sampled signals.

Generating the waveform capture frame may include determining bits in the first set of sampled signals and the second set of sampled signals that changed and adding to the waveform capture frame positions of the bits in the first set of sampled signals and the second set of sampled signals that changed.

The method may also include verifying the electronic circuit design using the waveform capture frame.

According to another embodiment, a device for testing an electronic circuit design includes a memory and a processor communicatively coupled to the memory. The processor determines a plurality of signals in the electronic circuit design that have been selected for waveform capture. Each of the plurality of signals updates after a respective number of clock cycles. The processor also forms, based on the respective numbers of clock cycles for the plurality of signals to update, a first group of signals from the plurality of signals and a second group of signals from the plurality of signals and samples the first group of signals according to a first sampling clock signal to produce a first set of sampled signals. The first sampling clock signal is set according to a minimum of the respective numbers of clock cycles for the signals of the first group of signals to update. The processor further samples the second group of signals according to a second sampling clock signal to produce a second set of sampled signals. The second sampling clock signal is set according to a minimum of the respective numbers of clock cycles for the signals of the second group of signals to update. The processor also generates a waveform capture frame based on the first set of sampled signals and the second set of sampled signals.

A size of the first group of signals may be based on the minimum of the respective numbers of clock cycles for the signals of the first group of signals to update. A size of the second group of signals may be based on the minimum of the respective numbers of clock cycles for the signals of the second group of signals to update. The size of the first group of signals may be larger than the size of the second group of signals based on the minimum of the respective numbers of clock cycles for the signals of the first group of signals to update being larger than the minimum of the respective numbers of clock cycles for the signals of the second group of signals to update. The processor may sample the first group of signals according to the first sampling clock signal to produce a third set of sampled signals. The waveform capture frame may be generated further based on the third set of sampled signals.

Generating the waveform capture frame may include aggregating the first set of sampled signals and the second set of sampled signals into the waveform capture frame based on detecting a change in the first set of sampled signals and the second set of sampled signals.

Generating the waveform capture may include determining bits in the first set of sampled signals and the second set of sampled signals that changed and adding, to the waveform capture frame, positions of the bits in the first set of sampled signals and the second set of sampled signals that changed.

The processor may verify the electronic circuit design using the waveform capture frame.

According to another embodiment, a method for testing an electronic circuit design includes generating a plurality of signals in the electronic circuit design. Each of the plurality of signals updates after a respective number of clock cycles. The method also includes grouping the plurality of signals based on the respective numbers of clock cycles for the plurality of signals to update to form a first group of signals and a second group of signals and sampling the first group of signals according to a first sampling clock signal to produce a first set of sampled signals. The first sampling clock signal is based on a minimum of the respective numbers of clock cycles for the signals of the first group of signals to update. The method further includes sampling the second group of signals according to a second sampling clock signal to produce a second set of sampled signals. The second sampling clock signal is based on a minimum of the respective numbers of clock cycles for the signals of the second group of signals to update. The method also includes generating a waveform capture frame based on the first set of sampled signals and the second set of sampled signals.

A size of the first group of signals may be based on the first sampling clock signal. A size of the second group of signals may be based on the second sampling clock signal. The size of the first group of signals may be larger than the size of the second group of signals based on the first sampling clock signal being slower than the second sampling clock signal. The method may include sampling the first group of signals according to the first sampling clock signal to produce a third set of sampled signals. The waveform capture frame may be generated further based on the third set of sampled signals.

Generating the waveform capture frame may include aggregating the first set of sampled signals and the second set of sampled signals into the waveform capture frame based on detecting a change in the first set of sampled signals and the second set of sampled signals.

Generating the waveform capture frame may include determining bits in the first set of sampled signals and the second set of sampled signals that changed and adding, to the waveform capture frame, positions of the bits in the first set of sampled signals and the second set of sampled signals that changed.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to waveform capture using multicycle path properties. Emulation may be used to test circuit designs. The emulation may be performed using a field programmable gate array (FPGA) or a custom semiconductor device. Emulation may allow the testing to be accelerated (e.g., by using a faster clock), but there may be some drawbacks. For example, it may be difficult to capture and analyze intermediate signals in the circuit design (e.g., due to lack of hardware pins to read out the signals). In some emulation systems, the signals in the circuit design may be bundled to reduce the number of hardware pins needed to read out the signals. Bundling the signals, however, uses multiplexing, which may limit the maximum speed at which the circuit design can be emulated or operated, effectively counteracting the acceleration gained from emulation.

Many of the signals in the circuit design may be on a multicycle path, which means that these signals may take multiple clock cycles to update. The present disclosure describes an emulation system that groups signals based on the number of clock cycles that it takes for the signals to update. The emulation system then samples the different groups of signals with a sampling clock that is set according to the minimum number of clock cycles for the groups to update. The system then generates a waveform capture frame using the sampled signals. The waveform capture frame may be used to test and verify the circuit design.

In some embodiments, such grouping provides the technical advantage of improving the speed of the emulation. Specifically, it effectively bundles the signals for testing without limiting the speed at which the circuit design can be emulated or operated as much as in existing emulation systems.

Figure 1:
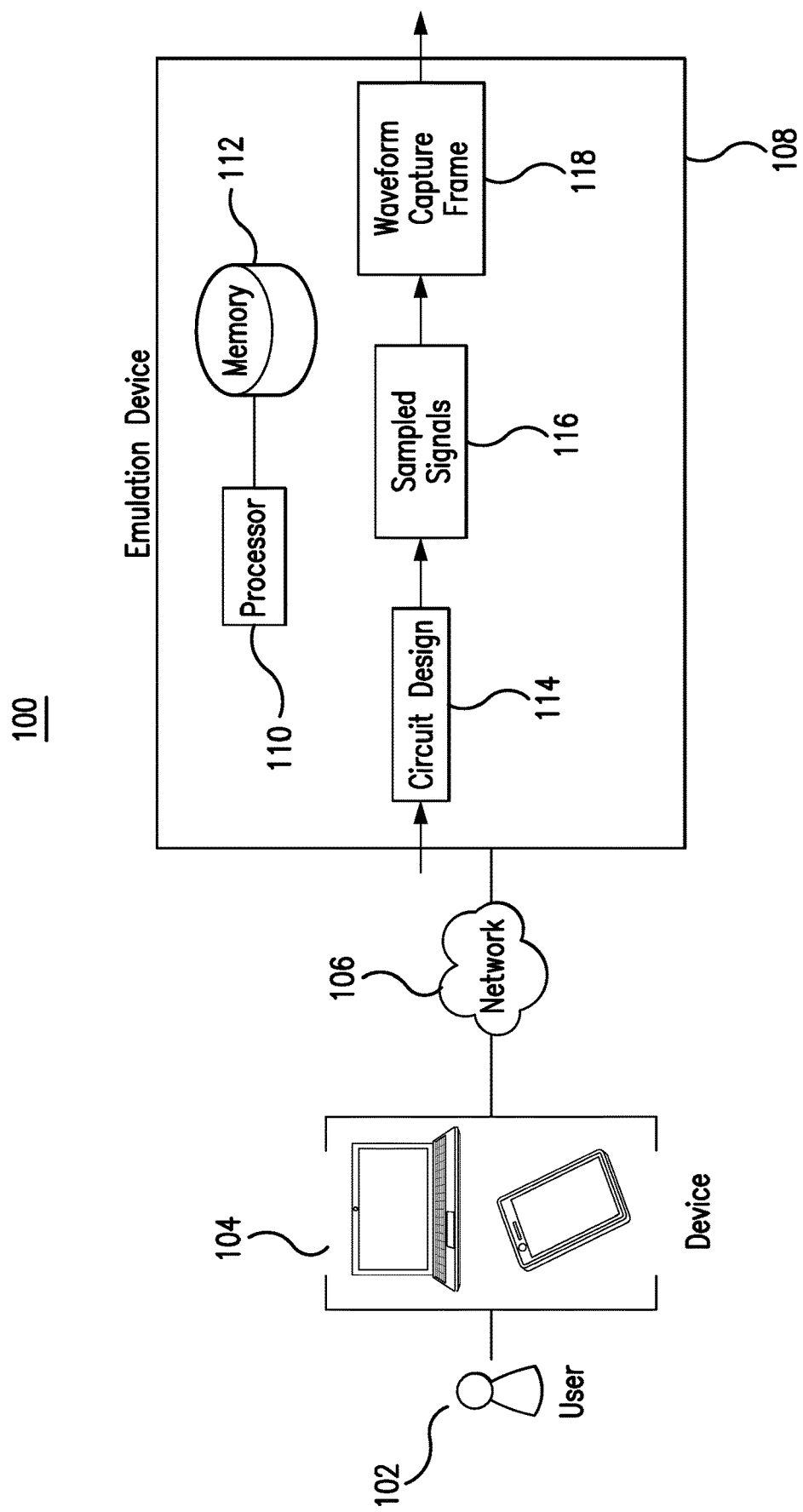
FIG. 1 illustrates an example emulation system.

FIG. 1 illustrates an example emulation system 100. As seen in FIG. 1, the system 100 includes one or more devices 104, a network 106, and an emulation device 108. Generally, the system 100 simulates or emulates the operation of a circuit design to test and verify the functions or features of the circuit design.

A user 102 may use the device 104 to control the emulation device 108. For example, the device 104 may communicate circuit designs to the emulation device 108. Additionally, the device 104 may instruct the emulation device 108 to begin testing the circuit design. The device 104 is any suitable device for communicating with components of the system 100 over the network 106. For, the device 104 may be a computer, a laptop, a wireless or cellular telephone, an electronic notebook, a personal digital assistant, or a tablet.

The network 106 is any suitable network operable to facilitate communication between the components of the system 100. For example, the network 106 may be a network 920 as described in FIG. 9.

The emulation device 108 emulates or simulates circuit designs to test or verify the functions or features of the circuit design. The emulation device 108 may be any suitable device that emulates or simulates the circuit design. For example, the emulation device 108 may include an FPGA or a custom semiconductor device. In certain embodiments, the emulation device 108 improves the speed of the emulation by bundling signals in a circuit design according to the number of clock cycles that it takes for the signals to update. As seen in FIG. 1, the emulation device 108 includes a processor 110 and a memory 112, which are configured to perform the functions and actions of the emulation device 108 described herein. In some embodiments, the emulation device 108 includes components of the emulation system 800 as described in FIG. 8 or the computer system 900 as described in FIG. 9.

The emulation device 108 receives a circuit design 114. For example, the emulation device 108 may receive the circuit design 114 from the user 102 or the device 104. The circuit design 114 may include a description of an electronic circuit. For example, the circuit design 114 may describe the components of the circuit as well as the connections between the components. The emulation device 108 may emulate or simulate the operation or functions of the circuit design 114. The emulation device 108 may then communicate or drive certain signals through the emulation or simulation to test the response of the circuit design. The user 102 or the emulation device 108 may review the output of the emulation or simulation to verify that the circuit design 114 is functioning or operating correctly.

Testing of the circuit design 114 may involve driving and analyzing certain signals output by the circuit design 114. Additionally, the testing may involve driving and analyzing intermediate signals within the circuit design 114. In some embodiments, the user 102 may specify the signals in the circuit design 114 that should be tested. These signals may be grouped or bundled together and communicated to hardware pins on the emulation device 108. The groups or bundles of signals may then be read out from the pins and analyzed to determine if the circuit design 114 is functioning or operating correctly. The emulation device 108 groups or bundles the signals according to the number of clock cycles that it takes for the signals to update. For example, the emulation device 108 may group or bundle signals that take a similar number of clock cycles to update.

The emulation device 108 may then determine a sampling clock frequency for each group or bundle of signals. The sampling clock frequency for a group of signals may be set according to the minimum number of clock cycles that it takes for the signals in the group of signals to update. For example, if it takes at least two clock cycles for the signals in a group of signals to update, then the emulation device 108 may set a sampling clock frequency as half the frequency of the emulation clock. The emulation device 108 then samples the signals in the group using the sampling clock. The emulation device 108 may repeat this process for each of the groups to produce the sampled signals 116 of the circuit design 114.

In some embodiments, the size of the groups or bundles of signals may be set according to the minimum number of clock cycles that it takes for the groups or bundles to update. For example, a group that takes a larger number of clock cycles to update may include a larger number of signals. By contrast, a group that takes a smaller number of clock cycles to update may include a smaller number of signals. As a result, groups of signals that update faster are smaller than groups of signals that update slower. In this manner, when a group of signals updates faster, the emulation device 108 samples fewer signals when sampling the group of signals.

After the emulation device 108 has produced the sample signals 116, the emulation device 108 may aggregate the sampled signals 116 into a waveform capture frame 118. The emulation device 108 then outputs the waveform capture frame 118 so that the sampled signals 116 may be analyzed to verify whether the circuit design 114 is functioning or operating correctly. In some embodiments, the emulation device 108 aggregates the sampled signals 116 into the waveform capture frame 118 according to the minimum number of clock cycles that it takes for a group of sampled signals 116 to update. For example, when a group of sampled signals 116 takes a fewer number of clock cycles to update, the emulation device 108 may include more samplings of that group of sampled signals 116 into the waveform capture frame 118. When a group of sampled signals 116 take more clock cycles to update, the emulation device 108 may include fewer samplings of that group of sampled signals 116 into the waveform capture frame 118. As a result, the waveform capture frame 118 may include more samplings of a group of signals that take a fewer number of clock cycles to update relative to a group of signals that take a larger number of clock cycles to update.

In some embodiments, the emulation device 108 includes a group of sampled signals 116 into the waveform capture frame 118 when the emulation device 108 detects a change in the value of the sampled signals 116 between samplings. For example, if the emulation device 108 determines that the values of the sampled signals 116 did not change between samplings, then the emulation device 108 may not include the sampled signals 116 in the waveform capture frame 118. In this manner, the emulation device 108 reduces the size of the waveform capture frame 118. Additionally, in some embodiments, the emulation device 108 does not include the actual values of the sampled signals 116 in the waveform capture frame 118. Rather, the emulation device 108 includes indications of the positions of bits in the sampled signals 116 that changed between samplings. In this manner, the waveform capture frame 118 includes the positions of bit values that changed between samplings rather than the values of every bit in the sampled signals 116. As a result, the size of the waveform capture frame 118 is further reduced in certain embodiments.

Figure 2:
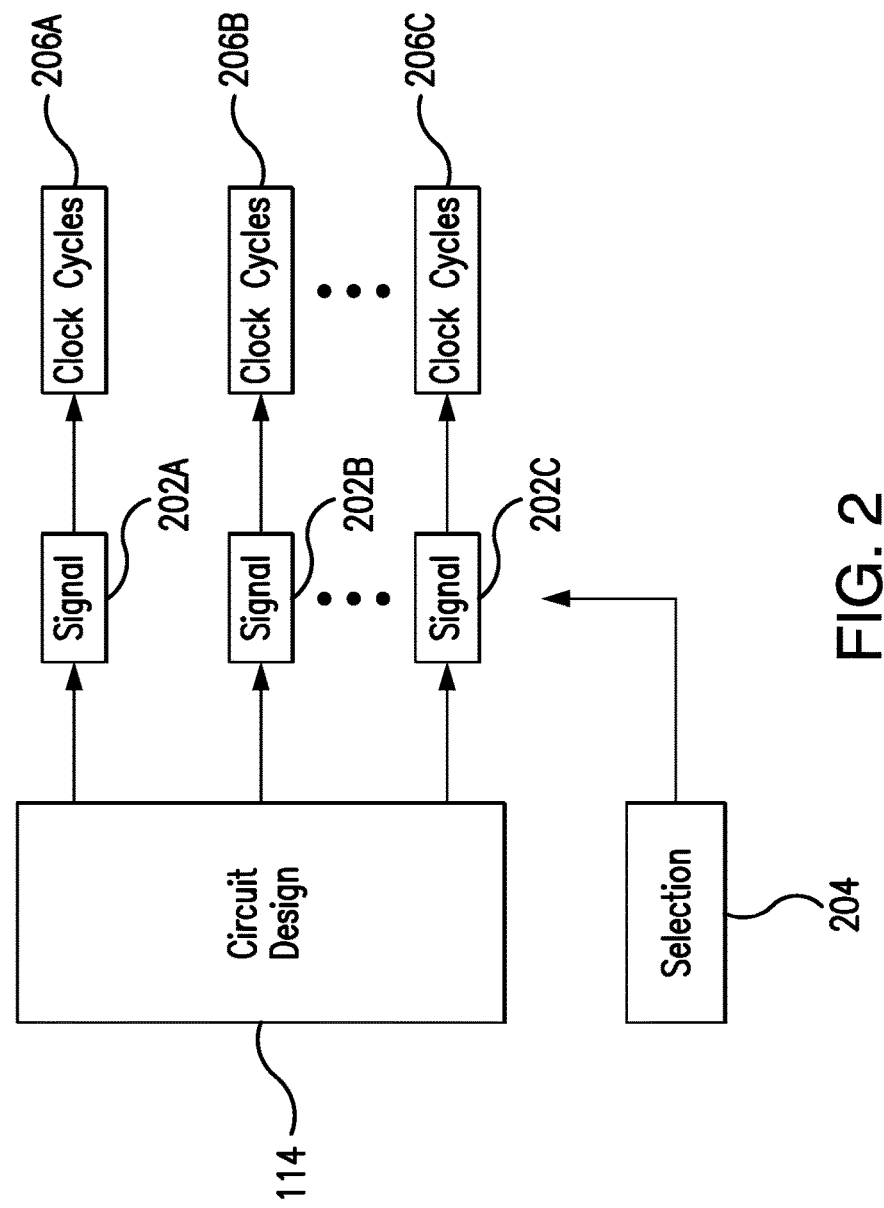
FIG. 2 illustrates an example emulation device determining signals of a circuit design in the system of FIG. 1.

FIG. 2 illustrates an example emulation device 108 of the system 100 of FIG. 1. Generally, FIG. 2 shows the emulation device 108 determining the signals 202 of the circuit design 114 that are to be sampled and analyzed during testing.

The emulation device 108 receives the circuit design 114 and determines the signals 202 of the circuit design 114. The signals 202 may be input signals, output signals, or intermediate signals of the circuit design 114. The emulation device 108 may determine any suitable number of signals 202 for any suitable circuit design 114. As the circuit design 114 grows larger or more complex, the more signals 202 that may be determined or analyzed for the circuit design 114. In the example of FIG. 2, the emulation device 108 determines the signals 202A, 202B, and 202C for the circuit design 114.

The emulation device 108 may receive a selection 204 from a user 102 or a device 104 shown in FIG. 1. The selection 204 may indicate the signals 202 that are to be analyzed during testing. The selection 204 may indicate any of the signals 202 of the circuit design 114. For example, the selection 204 may indicate any number of input signals, any number of output signals, and any number of intermediate signals of the circuit design 114. The emulation device 108 may determine, from the selection 204, the signals 202 of the circuit design 114 that should be sampled and included in the waveform capture frame 118 shown in FIG. 1.

The emulation device 108 may determine the number of clock cycles 206 that it takes for the selected signals 202 to update. As described previously, some of the signals 202 may be generated on a multicycle path. Stated differently, certain signals 202 may take multiple clock cycles to update. For example, some of the signals 202 may be on paths in the circuit design 114 that include components (e.g., combinational logic or other circuit elements) that delay the propagation of the signals 202 through the circuit design 114. As a result, the signals 202 may take multiple clock cycles to update. The emulation device 108 may analyze the signals 202 and the circuit design 114 to determine the number of clock cycles 206 that it takes for the signals 202 to update. In the example of FIG. 2, the emulation device 108 determines that the signal 202A updates in a number of clock cycles 206A, that the signal 202B updates in a number of clock cycles 206B, and that the signal 202C updates in a number of clock cycles 206C.

Figure 3:
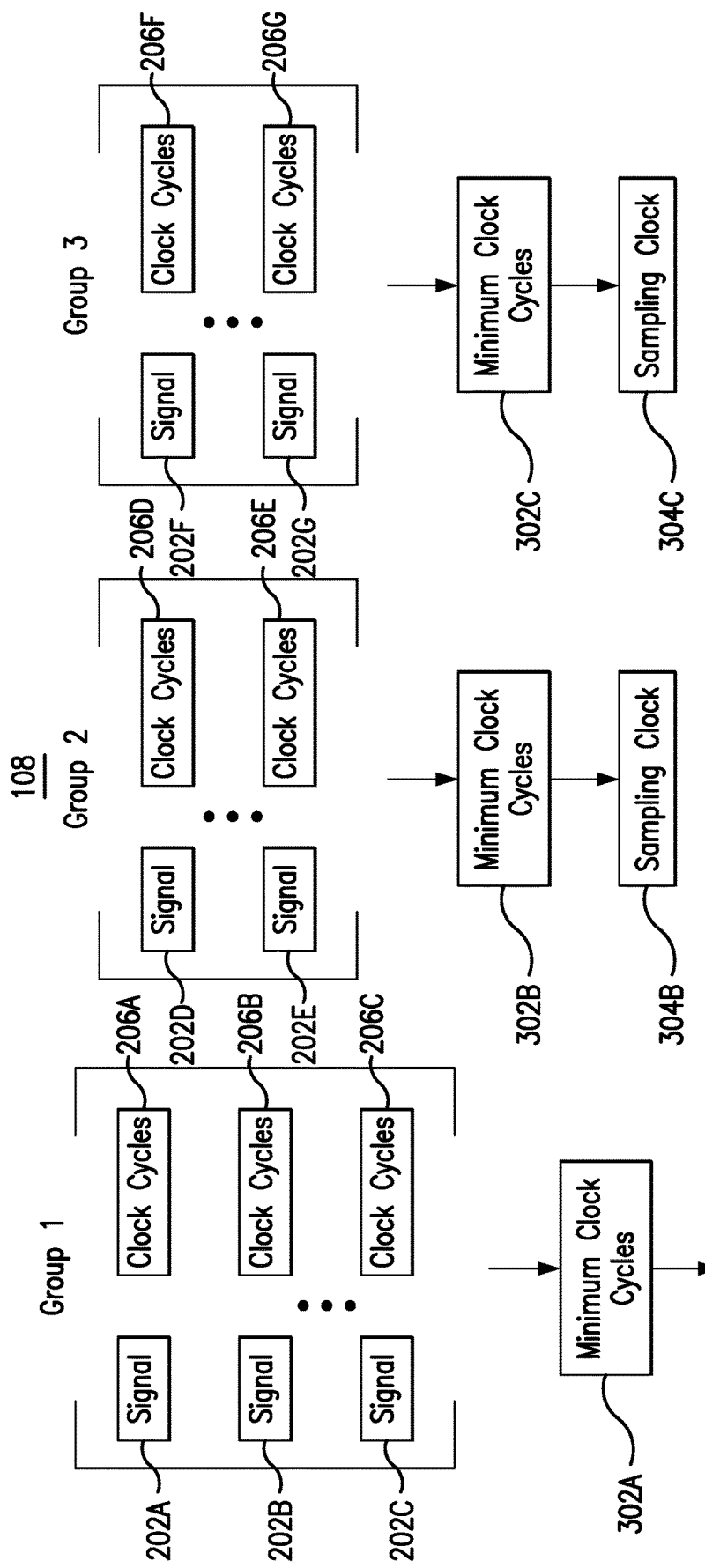
FIG. 3 illustrates the example emulation device of FIG. 2 grouping signals and determining sampling clocks.

FIG. 3 illustrates an example emulation device 108 of the system 100 of FIG. 1. Generally, FIG. 3 shows the emulation device 108 grouping signals 202 according to the number of clock cycles 206 that it takes for those signals 202 to update.

The emulation device 108 may group signals 202 together if the signals 202 take a similar number of clock cycles 206 to update. In the example of FIG. 3, the emulation device 108 groups the signals 202A, 202B, and 202C together in Group 1, because the number of clock cycles 206A, 206B, and 206C that it takes for the signals 202A, 202B, and 202C to update may be similar. The emulation device 108 also groups the signals 202D and 202E together in Group 2, because the number of clock cycles 206D and 206E that it takes for the signals 202D and 202E to update may be similar. The emulation device 108 also groups the signals 202F and 202G together in Group 3, because the number of clock cycles 206F and 206G that it takes for the signals 202F and 202G to update may be similar.

As discussed previously, the groups formed by the emulation device 108 may include any suitable number of signals 202. In some embodiments, the number of signals 202 included in a group may be set according to the minimum of the number of clock cycles 206 that it takes for the signals 202 in the group to update. For example, if the minimum of the number of clock cycles 206 for a group is large, then the emulation device 108 may include more signals 202 in the group. If the minimum of the number of clock cycles 206 in a group is small, then the emulation device 108 may include fewer signals 202 in the group. As a result, the signals 202 in a larger group may be slower to update, and the signals 202 in a smaller group may be faster to update. The emulation device 108 may determine the minimum number of clock cycles 206 for a group by analyzing each of the numbers of clock cycles 206 for the signals 202 in a group and determining the smallest of the number of clock cycles 206 for the group.

As an example, if the minimum number of clock cycles 206 that it takes for the signals 202 in Group 3 to update is sixteen clock cycles, then the emulation device 108 may include 100 signals 202 in Group 3. If the minimum number of clock cycles 206 that it takes for the signals 202 in Group 2 to update is eight clock cycles, then the emulation device 108 may include 80 signals 202 in Group 2. If the minimum number of clock cycles 206 that it takes for the signals 202 in Group 1 to update is four clock cycles, the emulation device 108 may include 40 signals 202 in Group 1. As can be seen in this example, the larger the minimum number of clock cycles 206 that it takes for the signals 202 in a group to update, the more signals 202 the emulation device 108 includes in the group.

The emulation device 108 determines the minimum number of clock cycles 302, and a sampling clock 304 for each group. The emulation device 108 determines the smallest of the number of clock cycles 206 in each group. The emulation device 108 sets that smallest number of clock cycles 206 as the minimum number of clock cycles 302 for that group. In the example of FIG. 3, the emulation device 108 determines that Group 1 has a minimum number of clock cycles 302A, that Group 2 has a minimum number of clock cycles 302B, and that Group 3 has a minimum number of clock cycles 302C. The emulation device 108 then sets a sampling clock 304 for each group according to the minimum number of clock cycles 302 for that group. For example, if the minimum number of clock cycles 302 for a group is sixteen clock cycles, then the emulation device 108 may set a sampling clock 304 for that group with a frequency of 1/16 of the emulation clock. As a result, the sampling clock 304 for a group may be faster if the signals 202 in the group take a smaller minimum number of clock cycles 302 to update. In some embodiments, the emulation device 108 multiples these frequencies by the number of signals 202 present in their respective groups to produce the sampling clock 304 frequencies. In the example of FIG. 3, the emulation device 108 determines a sampling clock 304A for Group 1, a sampling clock 304B for Group 2, and a sampling clock 304C for Group 3.

Figure 4:
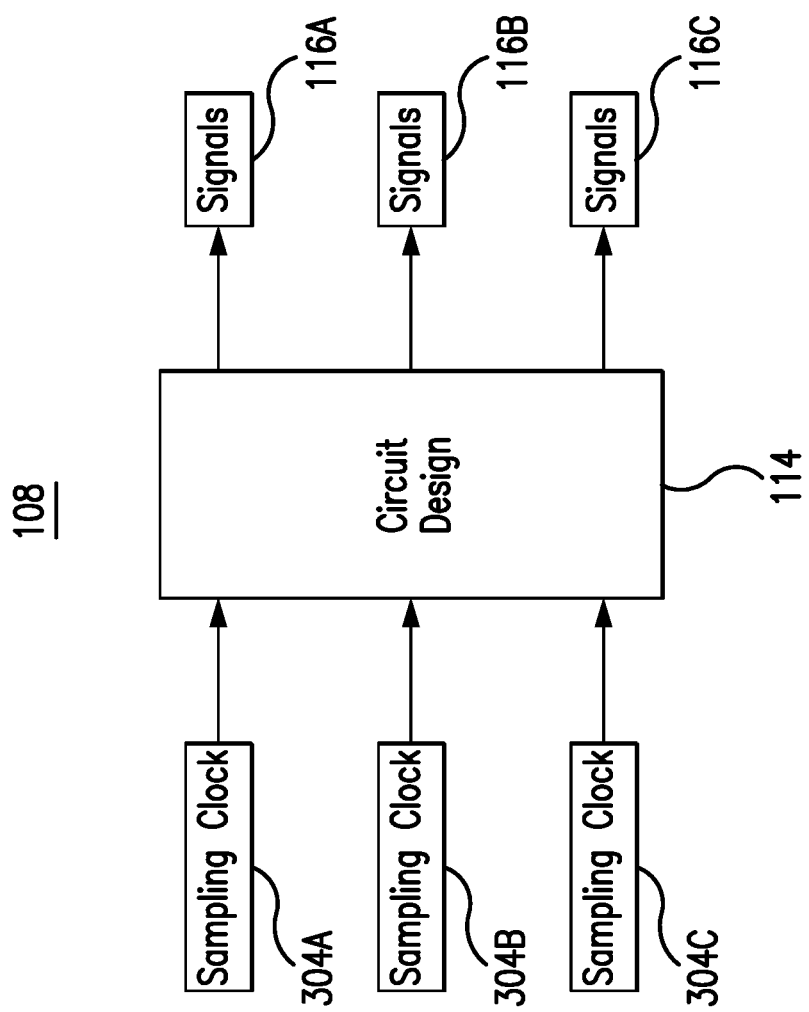
FIG. 4 illustrates the example emulation device of FIG. 2 sampling grouped signals.

FIG. 4 illustrates an example emulation device 108 of the system 100 of FIG. 1. Generally, FIG. 4 shows the emulation device 108 sampling selected signals of the circuit design 114 to using the sampling clocks 304 to produce the sampled signals 116.

Using the previous example, the emulation device 108 may sample the signals 202 of Group 1 using the sampling clock 304A to produce the sampled signals 116A. The emulation device 108 may sample the signals 202 of Group 2 using the sampling clock 304B to produce the sampled signals 116B. The emulation device 108 may sample the signals 202 of Group 3 using the sampling clock 304C to produce the sampled signals 116C. In this manner, each of the signals 202 in a group is sampled using the sampling clock 304 for that group to produce the sampled signals 116.

In some embodiments, the emulation device 108 may sample certain groups of signals 202 multiple times using their respective sampling clock 304 to produce multiple sets of sampled signals 116 for that group. Generally, the faster the sampling clock 304 for a group, the more times the emulation device 108 may sample the signals 202 of that group and the more sets of sampled signals 116 that the emulation device 108 may produce for that group. For example, if the sampling clock 304A is four times as fast as the sampling clock 304C, then the emulation device 108 may sample the signals 202 of Group 1 four times as many times as the signals 202 of Group 3. As a result, the emulation device 108 may produce four sets of sampled signals 116A while producing only one set of sampled signals 116C. Stated differently, the emulation device 108 may sample the signals 202 of Group 1 using the sampling clock 304A more times than the emulation device 108 samples the signals 202 of Group 3 using the sampling clock 304C.

Figure 5:
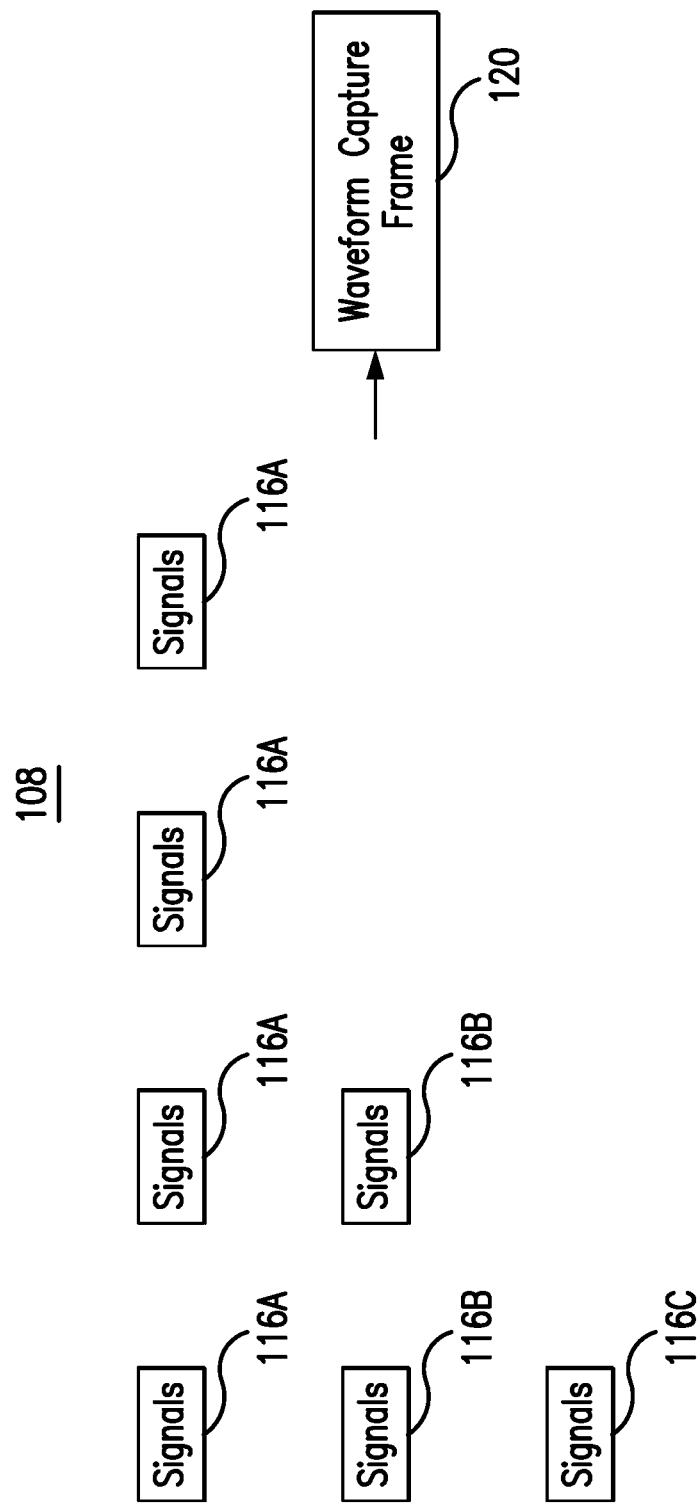
FIG. 5 illustrates the example emulation device of FIG. 2 generating a waveform capture frame.

FIG. 5 illustrates an example emulation device 108 of the system 100 of FIG. 1. Generally, FIG. 5 shows the emulation device 108 forming the waveform capture frame 120 using the sampled signals 116. In the example of FIG. 5, the emulation device 108 includes four sets of the sampled signals 116A, two sets of the sampled signals 116B, and one set of the sampled signals 116C in the waveform capture frame 120. The emulation device 108 may have sampled the signals 202 in Group 1 four times using the sampling clock 304A to produce the four sets of sampled signals 116A. The emulation device 108 may have sampled the signals 202 in Group 2 twice using the sampling clock 304B top produce the sampled signals 116B. The emulation device 108 may have sampled the signals 202 in Group 3 once using the sampling clock 304C to produce the set of sampled signals 116C. The emulation device 108 aggregates the sampled signals 116A, 116B, and 116C into the waveform capture frame 120. As a result, the faster the sampling clock 304 used to generate the set of sampled signals 116, the more sets of those sampled signals 116 that are included in the waveform capture frame 120.

In some embodiments, the emulation device 108 includes a set of sampled signals 116 into the waveform capture frame 120 only if the emulation device 108 detects a value change in the bits of the sampled signals 116 between samplings. As a result, if a set of sampled signals 116 does not change between samplings, then the emulation device 108 may not include that set of sampled signals 116 in the waveform capture frame 120. In this manner, the emulation device 108 keeps or prevents redundant information from being included in the waveform capture frame 120, which may reduce the size of the waveform capture frame 120. In some embodiments, the emulation device 108 includes the positions of the changed bits in the waveform capture frame 120 rather than the values of the bits of the sampled signals 116. As a result, the waveform capture frame 120 includes the bit positions in the sampled signals 116 that changed rather than the values of the bits of the sampled signals 116, which may reduce the size of the waveform capture frame 120, in certain embodiments.

Figure 6:
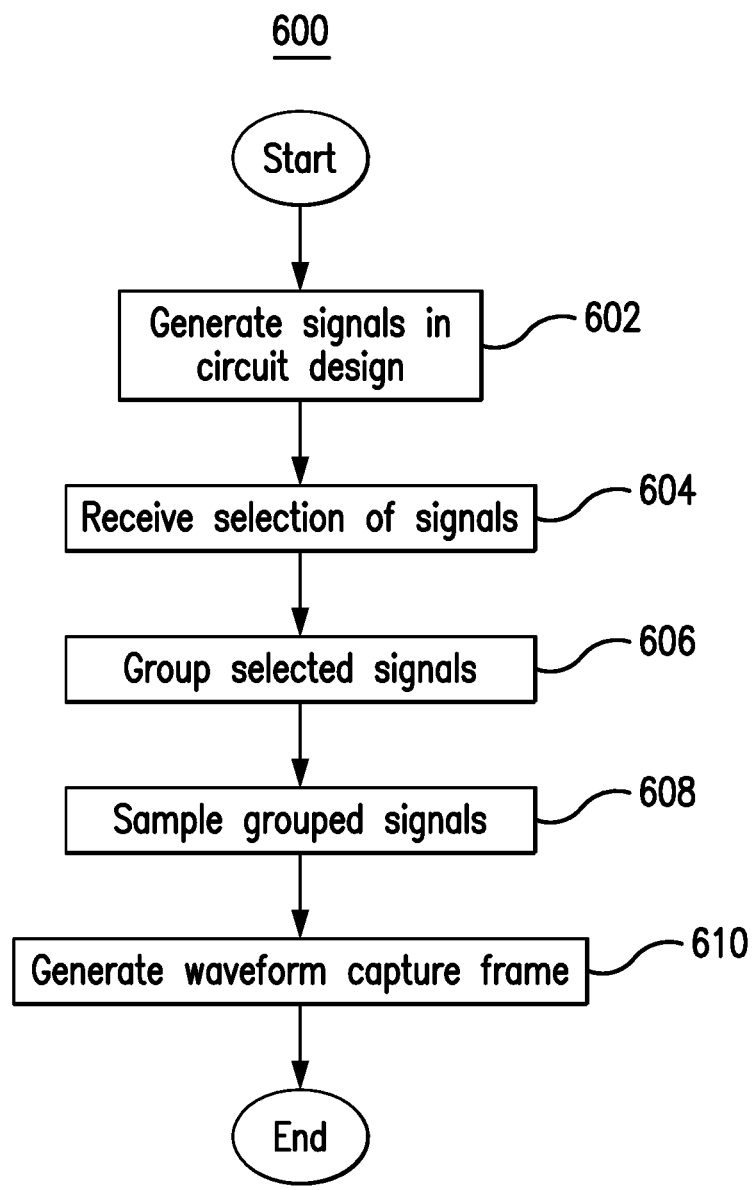
FIG. 6 is a flowchart of an example method for emulating or simulating a circuit design performed in the system of FIG. 1.

FIG. 6 is a flowchart of an example method 600 performed in the system 100 of FIG. 1. In certain embodiments, by performing the method 600, the emulation device 108 groups or bundles signals 202 according to the number of clock cycles 206 that it takes for the signals 202 to update, which may improve the speed of the emulation.

In 602, the emulation device 108 generates or determines the signals 202 in a circuit design 114. The emulation device 108 may have received the circuit design 114 from a user 102 or a device 104. The emulation device 108 may analyze the circuit design 114 to generate or to determine the signals 202 of the circuit design 114. The signals 202 may be input signals, output signals, or intermediate signals of the circuit design 114. Additionally, the emulation device 108 may determine the number of clock cycles 206 that it takes for each of the signals 202 to update. Some of the signals 202 may take multiple clock cycles to update.

In 604, the emulation device 108 receives a selection 204 of the signals 202 of the circuit design 114. The selection 204 may indicate the signals 202 that are to be analyzed during emulation and testing. A user 102 or a device 104 may have provided the selection 204 to the emulation device 108. In response, the emulation device 108 groups and bundles the selected signals 202 for emulation and testing.

In 606, the emulation device 108 groups the selected signals 202 according to the number of clock cycles 206 that it takes for the signals 202 to update. The emulation device 108 may form any suitable number of groups of signals 202. The signals 202 that are included in a group may take a similar number of clock cycles 206 to update. Additionally, the emulation device 108 may determine a minimum number of clock cycles 302 for the signals 202 in each group to update. The minimum number of clock cycles 302 may be the smallest of the number of clock cycles 206 for the signal 202 assigned to a group. The emulation device 108 then determines a sampling clock 304 according to the minimum number of clock cycles 302 for the group. The sampling clock 304 may have a frequency that is set according to the minimum number of clock cycles 302 for that group. For example, the sampling clock 304 for a group may have a frequency that is the frequency of the emulation clock divided by the minimum number of clock cycles 302 for that group and then multiplied by the number of signals 202 present in the group.

In some embodiments, the size of a group of signals 202 may depend on the number of clock cycles 206 that it takes for the signals 202 in that group to update. Generally, the larger the number of clock cycles 206 that it takes for the signals 202 in a group to update, the larger the number of signals 202 in the group. As a result, groups with signals 202 that update in a smaller number of clock cycles 206, may include a smaller number of signals 202. As an illustration, if the signals 202 in Group 1 take four cycles to propagate or update (multicycle path of four), the signals 202 in Group 2 take eight cycles to propagate or update (multicycle path of eight), and the signals 202 in Group 3 take sixteen cycles to propagate or update, one can include four times the number of signals 202 in Group 3 as compared to Group 1, and twice the number of signals 202 in Group 2 as compared to Group 1.

In 608, the emulation device 108 samples the grouped signals 202 using the sampling clocks 304 for the groups. Stated differently, the emulation device 108 samples the signals 202 in each group using the sampling clock 304 for that group. By sampling these signals 202, the emulation device 108 produces sets of sampled signals 116. The emulation device 108 my sample a group of signals 202 multiple times depending on the frequency of the sampling clock 304 for that group. Generally, the faster the sampling clock 304 for a group, the more times the emulation device 108 may sample the signals 202 for that group, and the more sets of sampled signals 116 that the emulation device 108 may produce for that group. In some embodiments, the emulation device sets the group sizes and the sampling clock frequencies in suitable proportions to minimize the overall number of groups and the frequency of the sampling clock.

In 610, the emulation device 108 generates a waveform capture frame 120 using the sets of sampled signals 116. The emulation device 108 may aggregate the sets of sampled signals 116 into the waveform capture frame 120. As discussed previously, some groups of signals 202 may be sampled multiple times depending on the frequency of the respective sampling clock 304 to produce multiple sets of sample signals 116 for that group. The emulation device 108 may include these multiple sets of sample signals 116 into the waveform capture frame 120 for a singular group. In some instances, because the sampling clock is fast, it is redundant to sample the same group of slow signals multiple times. Instead, the emulation device 108 may sample the slow group of signals only once and use the rest of the available sampling slots to sample other groups. Alternatively, the emulation device may utilize the redundancy to reduce the frequency of the fast sampling clock, thereby allowing the design to compile faster for the target emulator. Because different groups may be sampled by different sampling clocks, the sampled output of each group is thus scheduled after non-redundant sampling into a final waveform capture frame 120 defined by the fastest emulation sampling clock. As an illustration, if the signals 202 in Group 1 take four cycles to propagate or update (multicycle path of four), the signals 202 in Group 2 take eight cycles to propagate or update (multicycle path of eight), and the signals 202 in Group 3 take sixteen cycles to propagate, the emulation device 108 may assemble a final combined waveform capture frame 120 using the ratio of four samples of Group 1 signals 202 for every two samples of Group 2 signals 202 and for every one sample of Group 3 signals 202.

In some embodiments, the emulation device 108 includes a set of sampled signals 116 into the waveform capture frame 12, only if the sampled signals 116 in the set exhibit a change in value between samplings. In other words, the emulation device 108 may not include a set of sample signals 116 in the waveform capture frame 120 if no change occurred in that set of sampled signals 116. As a result, the emulation device 108 removes redundancies from the waveform capture frame 120 and reduces the size of the waveform capture frame 120, in some embodiments. Additionally, in some embodiments, the emulation device 108 includes in the waveform capture frame 120 indications of the bit positions that changed values between samplings rather than the actual values of the bits of the sampled signals 116. In this manner, the emulation device 108 reduces the size of the waveform capture frame 120, in certain embodiments. The waveform capture frame 120 may then be used to verify the operation and function of the circuit design 114.

Figure 7:
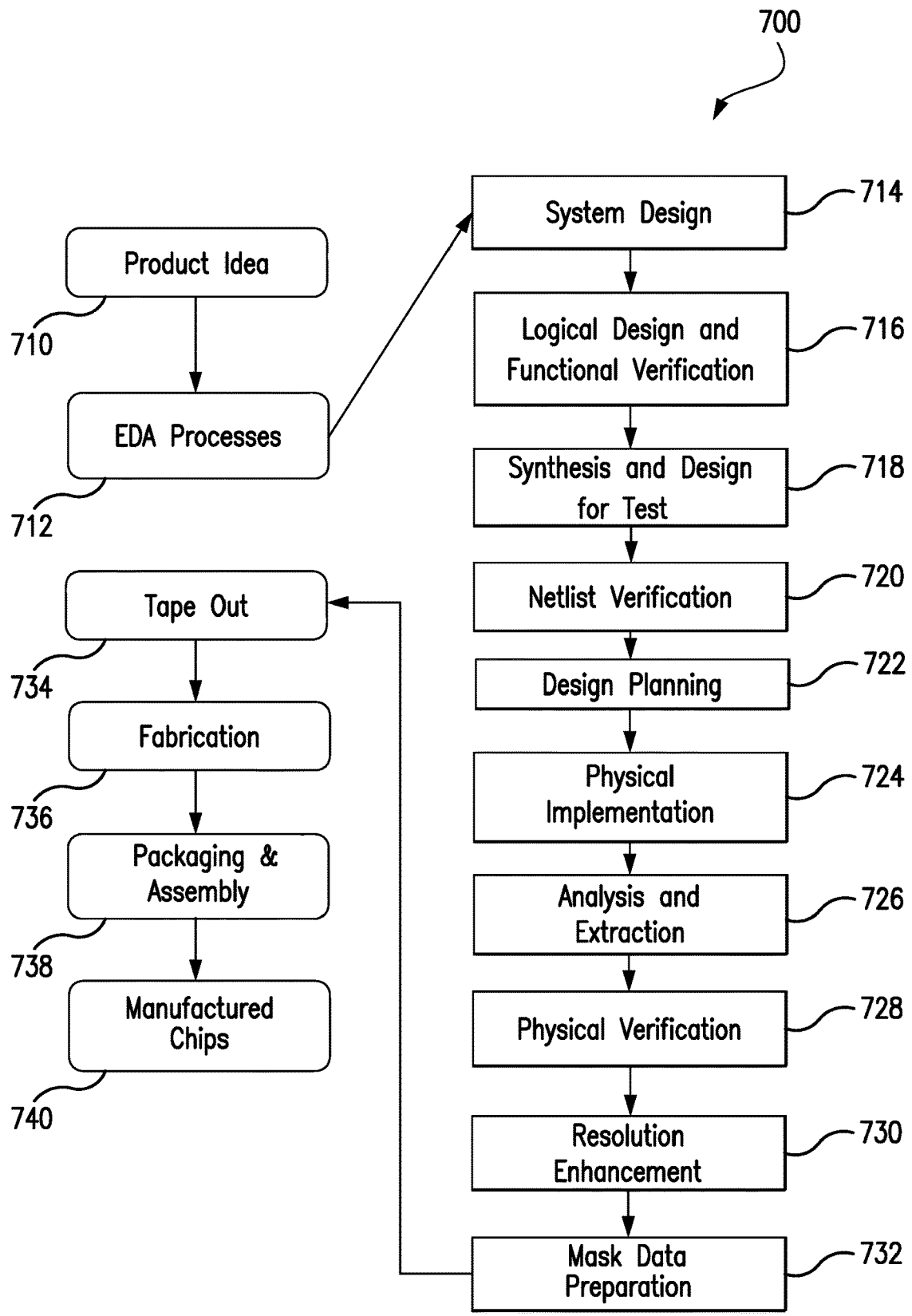
FIG. 7 depicts a flowchart of various processes used during the design and manufacture of an electronic circuit (e.g., an integrated circuit) in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
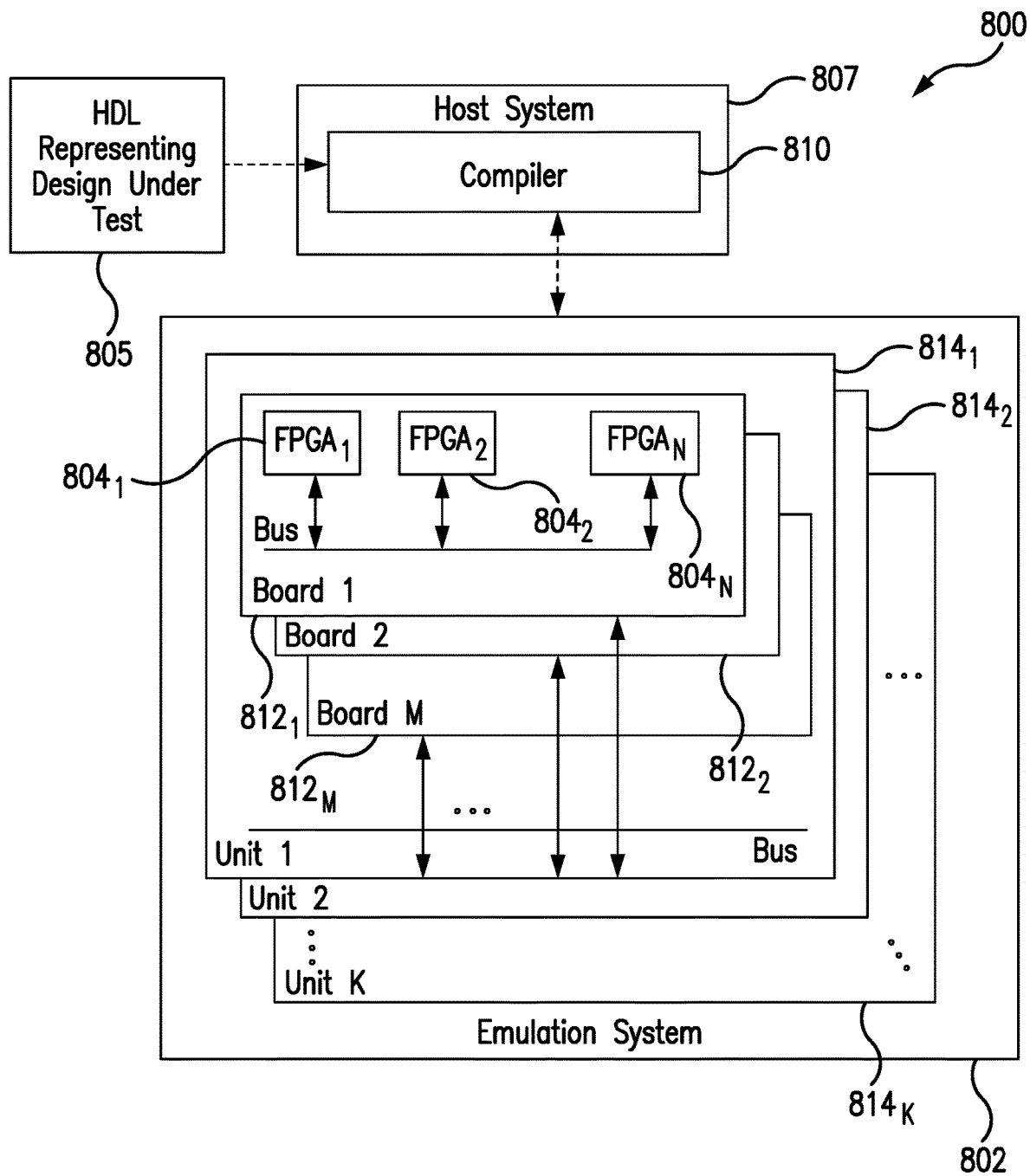
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
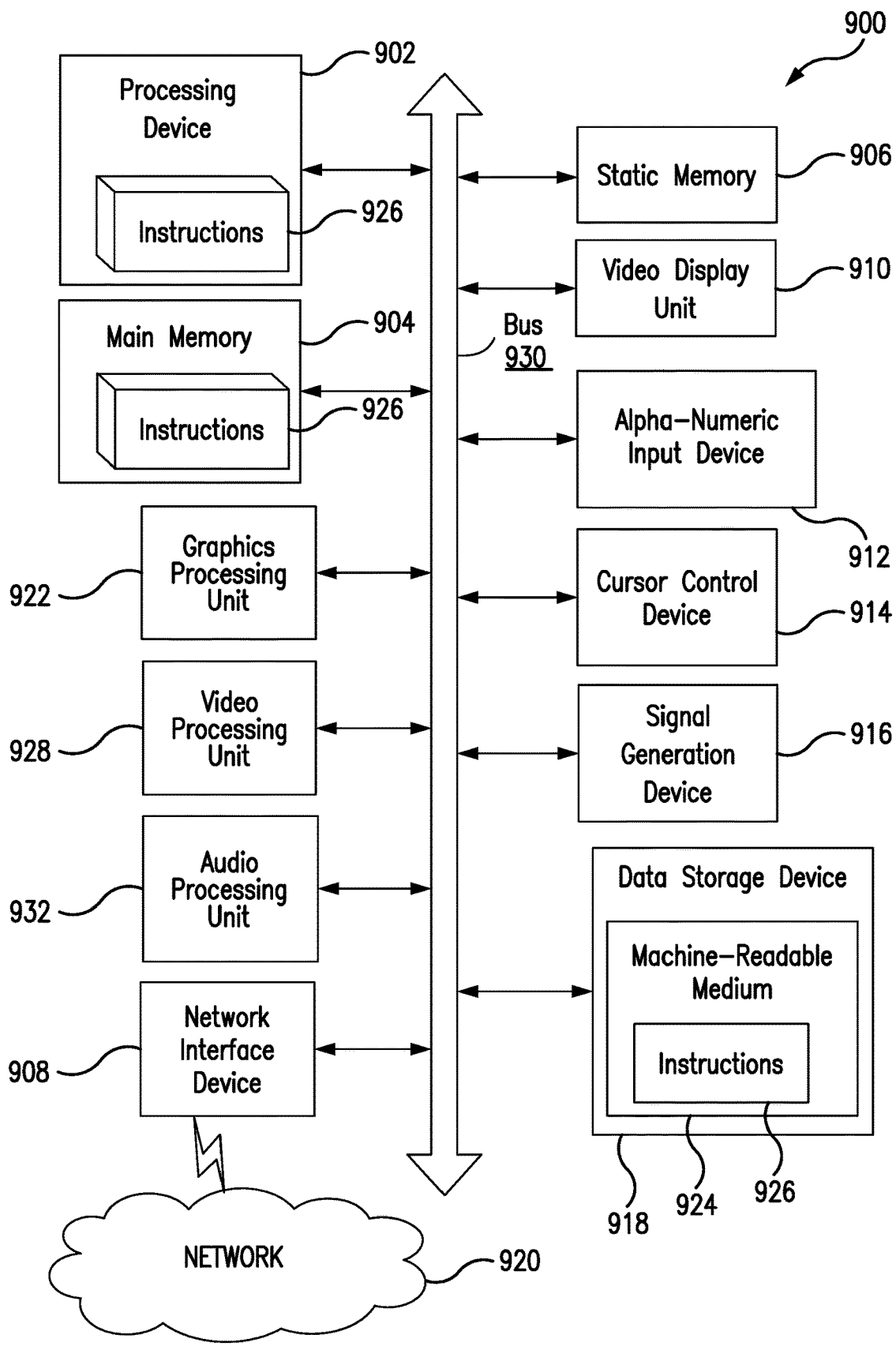
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for testing an electronic circuit design, the method comprising:
   determining a plurality of signals in the electronic circuit design that have been selected for waveform capture, wherein each of the plurality of signals updates after a respective number of clock cycles of an emulation clock signal;
   forming, based on the respective numbers of clock cycles for the plurality of signals to update, a first group of signals from the plurality of signals and a second group of signals from the plurality of signals;
   sampling the first group of signals according to a first sampling clock signal to produce a first set of sampled signals, wherein a frequency of the first sampling clock signal is set as a frequency of the emulation clock signal divided by a minimum of the respective numbers of clock cycles for the signals of the first group of signals to update, wherein a size of the first group of signals is based on the minimum of the respective numbers of clock cycles for the signals of the first group of signals to update;
   sampling the second group of signals according to a second sampling clock signal to produce a second set of sampled signals, wherein a frequency of the second sampling clock signal is set as a frequency of the emulation clock signal divided by a minimum of the respective numbers of clock cycles for the signals of the second group of signals to update, wherein a size of the second group of signals is based on the minimum of the respective numbers of clock cycles for the signals of the second group of signals to update, and wherein the size of the first group of signals is larger than the size of the second group of signals based on the minimum of the respective numbers of clock cycles for the signals of the first group of signals to update being larger than the minimum of the respective numbers of clock cycles for the signals of the second group of signals to update; and
   generating a waveform capture frame based on the first set of sampled signals and the second set of sampled signals.

2. The method of claim 1, further comprising sampling the first group of signals according to the first sampling clock signal to produce a third set of sampled signals, wherein the waveform capture frame is generated further based on the third set of sampled signals.

3. The method of claim 1, wherein generating the waveform capture frame comprises aggregating the first set of sampled signals and the second set of sampled signals into the waveform capture frame based on detecting a change in the first set of sampled signals and the second set of sampled signals.

4. The method of claim 1, wherein generating the waveform capture frame comprises:
   determining bits in the first set of sampled signals and the second set of sampled signals that changed; and
   adding, to the waveform capture frame, positions of the bits in the first set of sampled signals and the second set of sampled signals that changed.

5. The method of claim 1, further comprising verifying the electronic circuit design using the waveform capture frame.

6. A device for testing an electronic circuit design, the device comprising:
a memory; and
a processor communicatively coupled to the memory, the processor configured to:
determine a plurality of signals in the electronic circuit design that have been selected for waveform capture, wherein each of the plurality of signals updates after a respective number of clock cycles of an emulation clock signal;
form, based on the respective numbers of clock cycles for the plurality of signals to update, a first group of signals from the plurality of signals and a second group of signals from the plurality of signals;
sample the first group of signals according to a first sampling clock signal to produce a first set of sampled signals, wherein a frequency of the first sampling clock signal is set as a frequency of the emulation clock signal divided by a minimum of the respective numbers of clock cycles for the signals of the first group of signals to update, wherein a size of the first group of signals is based on the minimum of the respective numbers of clock cycles for the signals of the first group of signals to update;
sample the second group of signals according to a second sampling clock signal to produce a second set of sampled signals, wherein a frequency of the second sampling clock signal is set as a frequency of the emulation clock signal divided by a minimum of the respective numbers of clock cycles for the signals of the second group of signals to update, wherein a size of the second group of signals is based on the minimum of the respective numbers of clock cycles for the signals of the second group of signals to update, and wherein the size of the first group of signals is larger than the size of the second group of signals based on the minimum of the respective numbers of clock cycles for the signals of the first group of signals to update being larger than the minimum of the respective numbers of clock cycles for the signals of the second group of signals to update; and
generate a waveform capture frame based on the first set of sampled signals and the second set of sampled signals.

7. The device of claim 6, wherein the processor is further configured to sample the first group of signals according to the first sampling clock signal to produce a third set of sampled signals, wherein the waveform capture frame is generated further based on the third set of sampled signals.

8. The device of claim 6, wherein generating the waveform capture frame comprises aggregating the first set of sampled signals and the second set of sampled signals into the waveform capture frame based on detecting a change in the first set of sampled signals and the second set of sampled signals.

9. The device of claim 6, wherein generating the waveform capture frame comprises:
determining bits in the first set of sampled signals and the second set of sampled signals that changed; and
adding, to the waveform capture frame, positions of the bits in the first set of sampled signals and the second set of sampled signals that changed.

10. The device of claim 6, wherein the processor is further configured to verify the electronic circuit design using the waveform capture frame.

11. A method for testing an electronic circuit design, the method comprising:
generating a plurality of signals in the electronic circuit design, wherein each of the plurality of signals updates after a respective number of clock cycles of an emulation clock signal;
grouping the plurality of signals based on the respective numbers of clock cycles for the plurality of signals to update to form a first group of signals and a second group of signals;
sampling the first group of signals according to a first sampling clock signal to produce a first set of sampled signals, wherein a frequency of the first sampling clock signal is a frequency of the emulation clock signal divided by a minimum of the respective numbers of clock cycles for the signals of the first group of signals to update, wherein a size of the first group of signals is based on the minimum of the respective numbers of clock cycles for the signals of the first group of signals to update;
sampling the second group of signals according to a second sampling clock signal to produce a second set of sampled signals, wherein a frequency of the second sampling clock signal is a frequency of the emulation clock signal divided by a minimum of the respective numbers of clock cycles for the signals of the second group of signals to update, wherein a size of the second group of signals is based on the minimum of the respective numbers of clock cycles for the signals of the second group of signals to update, and wherein the size of the first group of signals is larger than the size of the second group of signals based on the minimum of the respective numbers of clock cycles for the signals of the first group of signals to update being larger than the minimum of the respective numbers of clock cycles for the signals of the second group of signals to update; and
generating a waveform capture frame based on the first set of sampled signals and the second set of sampled signals.

12. The method of claim 11, further comprising sampling the first group of signals according to the first sampling clock signal to produce a third set of sampled signals, wherein the waveform capture frame is generated further based on the third set of sampled signals.

13. The method of claim 11, wherein generating the waveform capture frame comprises aggregating the first set of sampled signals and the second set of sampled signals into the waveform capture frame based on detecting a change in the first set of sampled signals and the second set of sampled signals.

14. The method of claim 11, wherein generating the waveform capture frame comprises:
determining bits in the first set of sampled signals and the second set of sampled signals that changed; and
adding, to the waveform capture frame, positions of the bits in the first set of sampled signals and the second set of sampled signals that changed.

* * * * *